United States Patent
Conn et al.

(10) Patent No.: US 11,332,243 B1
(45) Date of Patent: May 17, 2022

(54) DRONE ASSEMBLIES FOR PROVIDING SHADE

(71) Applicants: Keith Conn, Magnolia, TX (US); Matthew Conn, Magnolia, TX (US)

(72) Inventors: Keith Conn, Magnolia, TX (US); Matthew Conn, Magnolia, TX (US)

( * ) Notice: Subject to any disclaimer, the term of this patent is extended or adjusted under 35 U.S.C. 154(b) by 64 days.

(21) Appl. No.: 16/417,212

(22) Filed: May 20, 2019

Related U.S. Application Data

(63) Continuation of application No. 15/811,273, filed on Nov. 13, 2017, now Pat. No. 10,293,936.

(60) Provisional application No. 62/543,588, filed on Aug. 10, 2017.

(51) Int. Cl.
| | |
|---|---|
| *G09F 21/10* | (2006.01) |
| *B64C 39/02* | (2006.01) |
| *G05D 1/00* | (2006.01) |
| *G09F 9/33* | (2006.01) |
| *G05D 1/10* | (2006.01) |

(52) U.S. Cl.
CPC ......... *B64C 39/024* (2013.01); *G05D 1/0027* (2013.01); *G05D 1/102* (2013.01); *G09F 9/33* (2013.01); *G09F 21/10* (2013.01); *B64C 2201/024* (2013.01); *B64C 2201/027* (2013.01); *B64C 2201/126* (2013.01)

(58) Field of Classification Search
None
See application file for complete search history.

(56) References Cited

U.S. PATENT DOCUMENTS

| | | | |
|---|---|---|---|
| 2002/0040255 A1* | 4/2002 | Neoh | H04R 1/1041 700/94 |
| 2014/0354172 A1* | 12/2014 | Beland | H05B 39/044 315/254 |
| 2017/0114971 A1* | 4/2017 | Cross | G09G 5/14 |
| 2019/0112048 A1* | 4/2019 | Culver | B64C 39/024 |

* cited by examiner

*Primary Examiner* — James M McPherson
(74) *Attorney, Agent, or Firm* — Elliott Law PLLC; Douglas H. Elliott; Nathan Q. Huynh

(57) ABSTRACT

The disclosure herein includes a drone assembly, which drone assembly may include: a drone; a screen; and a strut having a first portion and a second portion, wherein the first portion of the strut is coupled to the drone and the second portion of the strut is coupled to the screen.

11 Claims, 11 Drawing Sheets

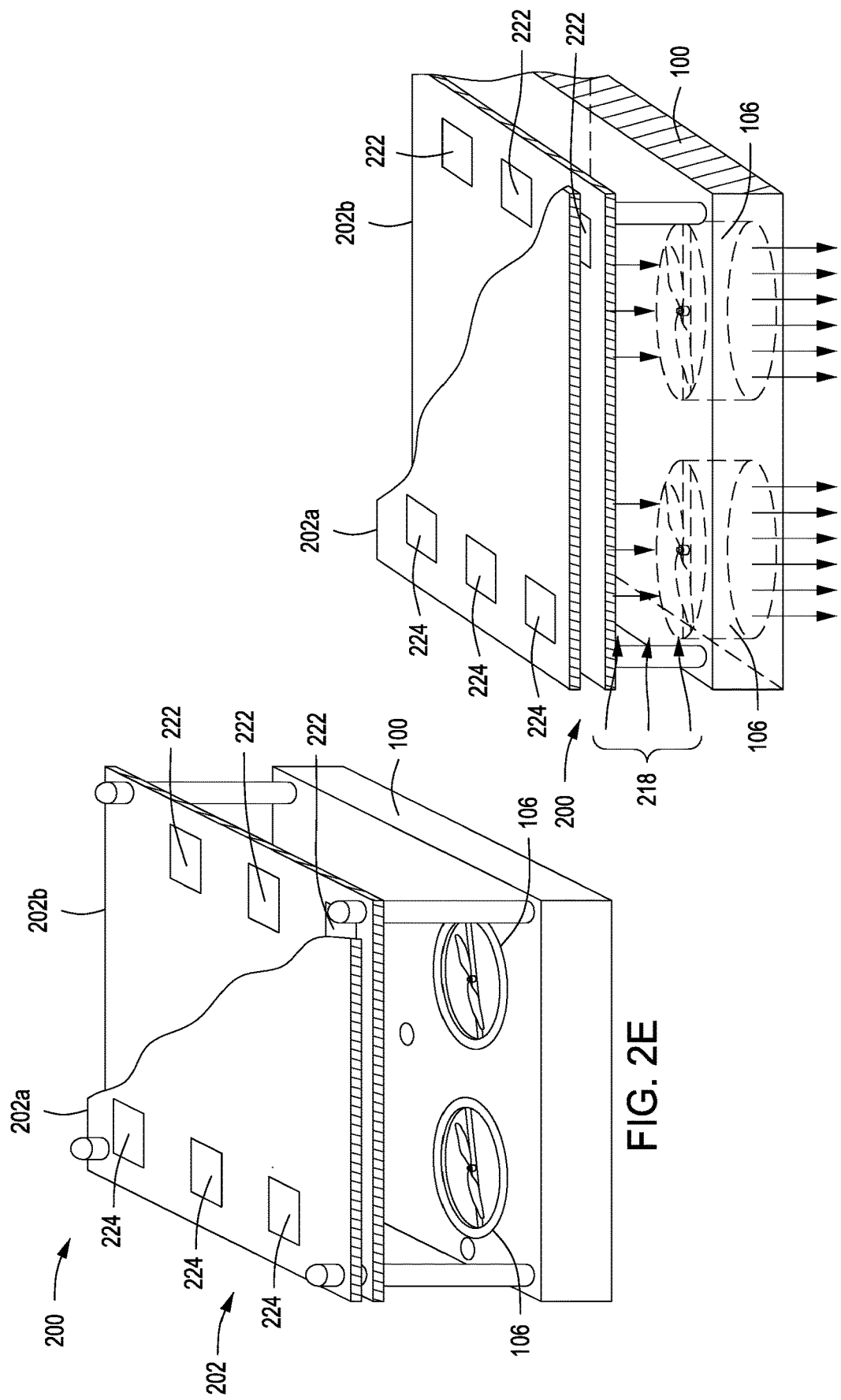

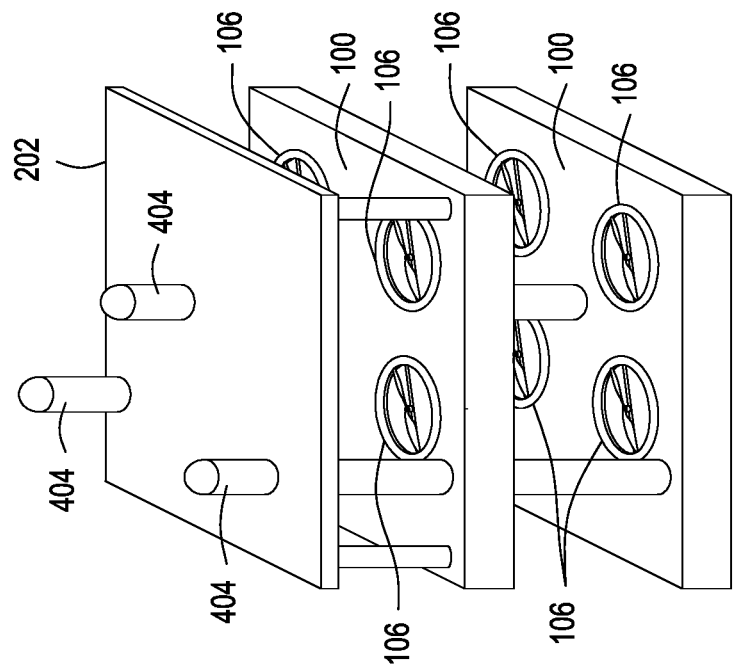
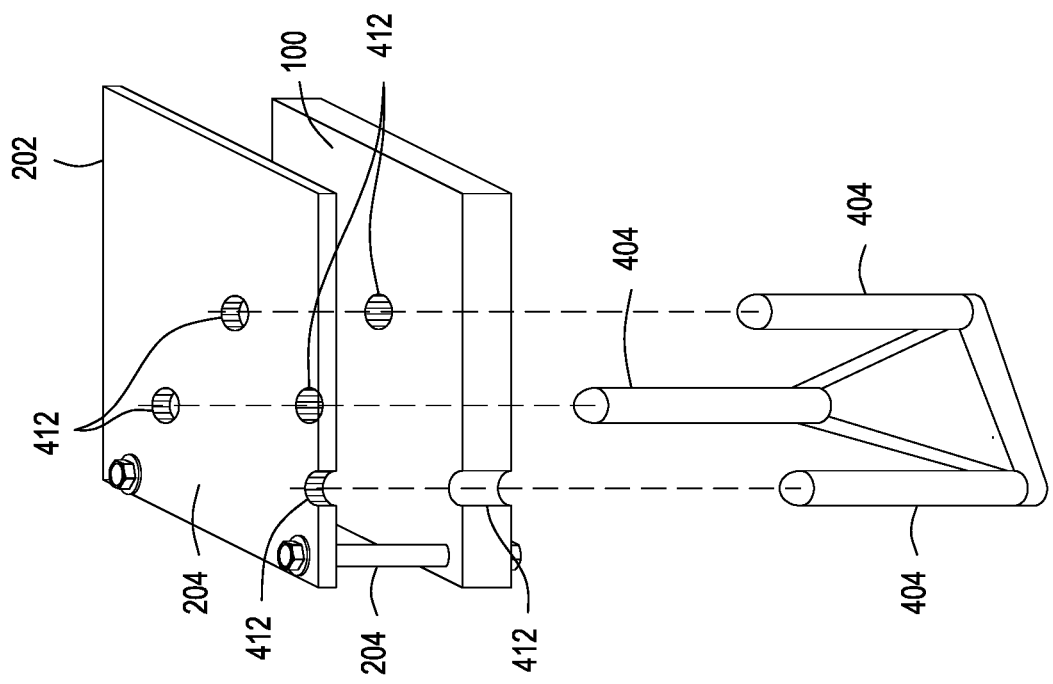
FIG. 4D
FIG. 4C

DRONE ASSEMBLIES FOR PROVIDING SHADE

CROSS REFERENCE TO RELATED APPLICATIONS

This application is a continuation of and claims benefit to co-pending non-provisional application Ser. No. 15/811,273, filed on Nov. 13, 2017, which claims benefit to provisional application Serial Number U.S. Provisional Application No. 62/543,588, filed on Aug. 10, 2017; and this application hereby incorporates herein those applications and all amendments thereto as if set forth herein in their entireties.

BACKGROUND

1. Field of Inventions

The field of this application and any resulting patent is drones.

2. Description of Related Art

Various assemblies and methods for providing shade over a target have been proposed and utilized, including some of the methods and structures disclosed in the references appearing on the face of this patent. However, those methods and structures lack the combination of steps and/or features of the methods and/or structures covered by the patent claims below. Furthermore, it is contemplated that the methods and/or structures covered by at least some of the claims of this issued patent solve many of the problems that prior art methods and structures have failed to solve. Also, the methods and/or structures covered by at least some of the claims of this patent have benefits that would be surprising and unexpected to a hypothetical person of ordinary skill with knowledge of the prior art existing as of the filing date of this application.

SUMMARY

The disclosure herein includes a drone assembly, preferably for providing shade, which drone assembly may include: a drone; a screen; and a strut having a first portion and a second portion, wherein the first portion of the strut may be coupled to the drone and the second portion of the strut may be coupled to the screen.

The disclosure herein includes a drone assembly, preferably for providing shade, which drone assembly may include: a drone having a lower surface and an upper surface; a screen having a lower surface, an upper surface, and an aperture; a strut having a first portion coupled to the drone and a second portion extending through the aperture of the screen; a first threaded assembly coupled to the first portion of the strut and disposed against the lower surface of the drone; and a second threaded assembly coupled to the second portion of the strut and disposed against the upper surface of the screen.

The disclosure herein includes a drone assembly, preferably for providing shade, which drone assembly may include: a drone having an aperture; a screen having an aperture; and a rack station that includes a base and a rack post extending from the base, wherein the rack post may extend through the aperture of the drone and the aperture of the screen.

The disclosure herein includes a method of coupling a drone assembly to a rack station, which method may include: sliding a rack post through a first aperture that may be disposed in a drone of the drone assembly; sliding the rack post through a second aperture that may be disposed in a screen of the drone assembly; and actuating a latch that may be disposed in an end of the rack post to a locking position.

The disclosure herein includes a drone assembly, preferably for providing shade, which drone assembly may include: a drone; a screen that has a flat upper surface and is rectangular-shaped; and four struts, each strut having a first portion and a second portion, wherein the first portion of the strut is coupled to the drone and the second portion of the strut is coupled to the screen, and either the first portion is removable from the drone or the second portion is removable from the screen, or both.

The disclosure herein includes a drone assembly, preferably for providing shade, which drone assembly may include: a drone having a lower surface and an upper surface; a screen that is flat and rectangular-shaped, and has a lower surface, an upper surface, and four apertures; four struts, each strut comprising: a first portion removably coupled to the drone; a second portion extending through one of the four apertures of the screen; and a third portion abutted against the lower surface of the screen and against the upper surface of the drone; a first threaded assembly coupled to the first portion of each of the four struts and disposed against the lower surface of the drone; and a second threaded assembly coupled to the second portion of each of the four struts and disposed against the upper surface of the screen.

The disclosure herein includes a drone assembly, preferably for providing shade, which drone assembly may include: a drone; three parallel screens, wherein each screen may be flat and rectangular-shaped; and four struts, each strut comprising: a first portion removably coupled to the drone; and a second portion removably coupled to the three parallel screens.

BRIEF DESCRIPTION OF THE DRAWINGS

FIG. 2E shows a drone assembly that includes a screen having apertures disposed therein.

FIG. 2F shows airflow through the drone assembly of FIG. 2E.

FIG. 4C shows a perspective view of a drone assembly and a rack assembly.

FIG. 4D shows a perspective view of a drone assembly coupled to a rack station.

DETAILED DESCRIPTION

1. Introduction

Figure 1:
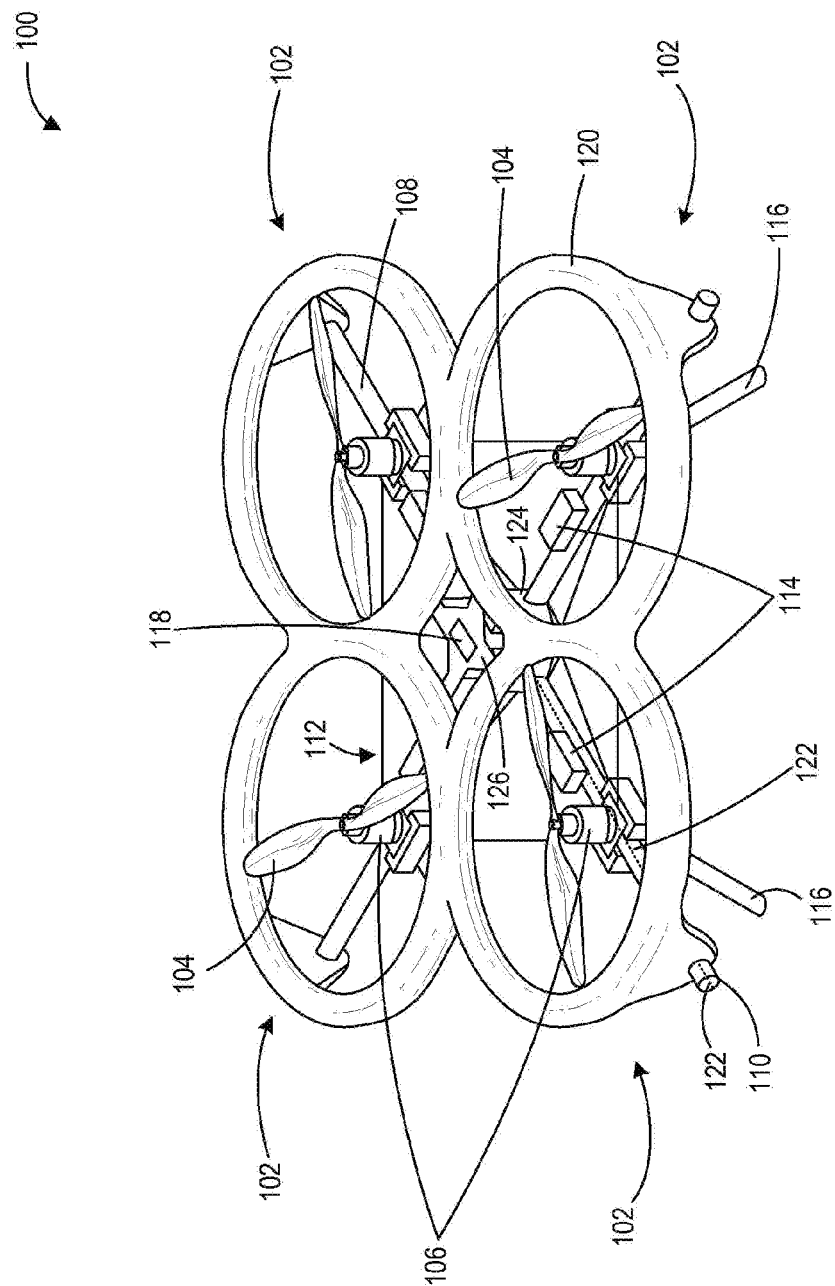
FIG. 1 shows a perspective view of an example of a drone including four rotors.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "autonomous" as used herein as an adjective is defined as capable of operating without real-time human intervention, preferably according to a predetermined set of coded instructions in response to different circumstances. For example, drone assemblies disclosed are capable of autonomous flight.

The term "abutted against" as used herein is defined as positioned adjacent to and physically touching, directly or indirectly. For example, a first object may be abutted against a second object such that the second object is limited from moving in a direction toward the first object. Thus, a screen may be abutted against an end of a non-threaded portion of a strut such that the screen prevents the strut from moving in a direction toward the screen. Also, a drone may be abutted against an end of a non-threaded portion of a strut and coupled together such that the drone prevents the strut from moving in a direction toward the drone. A strut may be abutted against a screen and held pressed to the screen by bolts and a threaded assembly, e.g., where the threaded assembly includes a washer that is disposed against and in physical contact with the screen and a nut having a threaded inner surface that is disposed against and in physical contact with the washer. A strut may be abutted against a drone and held pressed to the drone by bolts and a threaded assembly, e.g., where the threaded assembly includes a washer that is disposed against and in physical contact with the drone and a nut having a threaded inner surface that is disposed against and in physical contact with the washer. A first drone in a first drone assembly may be abutted against a second drone in a second drone assembly resulting in a third drone assembly. Similarly, a first screen in first drone assembly may be abutted against second screen in a second drone assembly.

The term "aperture" as used herein is defined as any opening in a solid object, e.g., a screen, a drone, or some other structure. For example, an aperture may be an opening that begins on one side of the solid object and ends on the other side of the object. An aperture may alternatively be an opening that does not pass entirely through the object, but only partially passes through, e.g., a groove or indentation. An aperture can be an opening in an object that is completely circumscribed, defined, or delimited by the object itself, e.g., an aperture in or passing through a screen. Alternatively, an aperture can be an opening in the object when the object is combined with one or more other objects or structures. One or more apertures may be disposed and pass entirely through a screen. One or more apertures may be disposed and pass entirely through a drone. An aperture may receive another object and permit ingress and/or egress of the object through the aperture. Thus, an aperture of a drone may receive a rack post therethrough. A threaded portion of a strut may extend through an aperture of a screen.

The term "coupled" as used herein is defined as directly or indirectly connected, attached, or integral with, e.g., part of. A first object may be coupled to a second object such that the first object is positioned at a specific location and orientation with respect to the second object. A first object may be either permanently or removably coupled to a second object. Two objects may be permanently coupled to each other, e.g., via adhesive or welding; or they may be removably coupled e.g., one or more via collets, latches, nails, screws, nuts and/or bolts, magnets, or electromagnets. Thus, a strut may be removably coupled to a screen such that the strut may then be uncoupled and then removed from the screen. A strut may be removably coupled to a drone such that the strut may then be uncoupled and then removed from the drone. Two objects may also be slidably coupled where one object is slid through the aperture of another object. For instance, a drone assembly and a rack post of a rack station may be slidably coupled where the rack post is slid through apertures disposed in a drone and a screen of a drone assembly. Also, two objects may be capable of being threadably coupled, e.g., where a threaded outer surface of one object is capable of engaging with or to a threaded inner surface of another object. Thus, a threaded assembly may be threadably coupled to a threaded portion of a strut where a threaded inner surface of the threaded assembly engages with or to a threaded outer surface of the threaded portion of the strut. A drone in one drone assembly may be coupled to another drone in another drone assembly. A screen in one drone assembly may be coupled to another screen in another drone assembly.

The term "drive unit" as used herein means an electronic component that includes a rotor coupled to a motor and a power source, e.g., rechargeable battery. A drive unit may include a separate power source dedicated to a particular drive unit. A drive unit may be powered by a single power source via an electrical distribution line connected from the drive unit to the power source. A drive unit may be sized according to the desired performance capabilities of a drone.

The term "drone" as used herein means an unmanned aerial vehicle. A drone may be rotor-based. An example of a conventional drone described herein can be found in U.S. Pat. No. 9,457,899. A drone may operate autonomously via an onboard autopilot system or installed software. A drone may be operated via remote control by a person. A drone may include onboard controls, a sensor suite, and one or more batteries. A drone may be arranged in a four-rotor configuration, which includes four drive units. A drone preferably has a plurality of drive units arranged in a substantially square pattern, e.g., in a two-by-two array. A drone may have any number of drive units arranged in varying configurations.

The term "rack post" as used herein means an elongated structure that extends from a base of a rack station. A drone assembly is preferably capable of being slidably coupled to a rack post where the rack post is slid through apertures disposed in the drone assembly. One or more rack posts may extend from a base of a rack in a configuration corresponding to a configuration of aperture disposed in a drone assembly. A rack post may have a latch disposed thereon.

The term "latch" as used herein means a structure capable of coupling two objects together, e.g., a structure disposed on a rack post of a rack station that is capable of obstructing the coupling or uncoupling of a drone assembly and the rack station. A latch may be a protrusion that extends radially outward from a rack post to a locked position. A latch may be a protrusion that retreats radially inward into a rack post to an unlocked position. A latch may be disposed in an end of a rack post opposite a base of the rack.

The term "rack station" as used herein means a structure having a base and one or more rack posts. A rack station may have one or more rack posts extending upward from a base. A rack station may have one or more rack posts removably coupled to a base. A rack station may have one or more rack posts that are integral, e.g., part of, a base. A rack station may have one or more rack posts coupled to a base. A rack station may be capable of establishing of electronic communication with another rack station through wired or wireless connections. A rack station may have an associated index number.

The term "recharging device" as used herein means an electronic device that is capable of transferring electromagnetic energy to a rechargeable battery. A recharging device may be an inductive transmitter. A recharging device may include a resonance inductive coil wound around a core. A recharging device may be capable of being in physical contact with connectors on a rechargeable battery, wherein the recharging device may conduct electrical energy to the connectors.

The term "remote control device" as used herein means an electronic device capable of controlling three-axis flight of a drone assembly. A remote control device may include a tablet computer device, a smartphone, a wearable computer device, or any handheld remote control input device.

The term "screen" as used herein means a structure that is capable of providing shade. A screen is preferably opaque and coupled to a drone. A screen is preferably capable of providing shade on some surface by obstructing at least some light waves that travel from a light or heat source, e.g., the sun, toward that surface. A screen is preferably flat, and can be flexible or rigid. A screen can have any of a variety of shapes, and is preferably rectangular or square, but may also be elliptical or circular. A screen may be removably or permanently mounted to any portion of a drone, but is preferably a sufficient distance from the upper surface of the drone to avoid interfering with the movement of air through the drone rotors. For example, the lower surface of a screen may be positioned from the upper surface of the drone a distance as small as 0.5 inch, 1.0 inch, or 2.0 inches to as great as 4.0 inches, or 5.0 inches, or 6.0 inches, or 7.0 inches, or 8.0 inches, or 10.0 inches, or 11.0 inches, or 12.0 inches, or 15.0 inches, or 20.0 inches, or even farther above the drone to which it is coupled. A screen can be of any size sufficient to provide the desired amount of shade, and may have a surface area of, for example, as little as 9.0, or 10.0, or 11.0, or 12.0 or 13.0 square feet, to as much as 14.0, or 15.0 or 20.0, or 25.0 or 30.0 or 40.0 square feet, or even more. In at least one example, a screen for coupling with a drone as described herein is square with dimensions of 4 feet wide by 4 feet long. A screen is preferably planar, e.g., flat on both the upper and lower surfaces. A screen may have a lower surface and an upper surface, where "upper" and "lower" refer to the perpendicular direction of the surface when the drone assembly including the screen is in the air and providing shade. In other words, the upper surface generally faces the sun and the lower surface generally faces the target. Certain screens may have six planar sides that form a rectangular prism. A screen may have a planar lower surface, planar upper surface, and four planar sides disposed between the upper and lower planar surfaces. A screen may have an upper surface that includes light-reflecting material, e.g., glass, aluminum, or plastic. A screen may have an upper surface that includes solar cells capable of absorbing and converting sunlight into electrical energy for storage in batteries on a drone. A screen may include material to focus, concentrate, or intensify light directed towards solar cells. A screen may have a one or more set of apertures disposed therein, e.g., holes. A screen may include an electronic light-emitting display, e.g. computer monitor or LCD screen. A screen may include electronic sound emitting speakers. A screen may include a plurality of screens stacked together. A screen may include water-repellant material, e.g. rubber and electrostatic material. A screen may include a plurality of magnetic connections, e.g. magnets and electromagnets. A screen may include various sensors for detecting one or more physical properties, e.g., speed, distance, position, orientation, light spectrum, temperature, or chemical content. A screen may include various sensors, e.g., proximity sensors, photo sensors, gyroscopes, accelerometers, and magnetometers.

The term "shade" as used herein is defined as any degree of darkness and/or coolness on a surface caused by an obstruction of light waves travelling toward the surface that are blocked from hitting that surface in whole or in part by some object, e.g., a screen and/or drone. The light waves that are obstructed may include any portion of the light spectrum, e.g. any wavelength or range of wavelengths. Shade may be a shadow cast by an object positioned between a light source, e.g., the sun, and a surface. Shade may be cast in which all wavelengths of light are blocked from reaching a surface. Shade resulting from an object positioned between a light source, e.g., the sun, and a surface, may obstruct wavelengths of infrared (IR) and/or ultraviolet (UV), i.e. heat, but, in some cases, not wavelengths of visible light. Shade resulting from an object positioned between a light source, e.g., the sun, and a surface, may obstruct light having a wavelength as small as 0.001 µm, 0.01 µm, 0.039 µm, 0.48 µm, 0.53 µm, 0.575 µm, 0.06 µm, 0.07 µm, or 1 µm, to as great as 10 µm, 100 µm, 1000 µm, or even greater.

The term "strut" as used herein refers to any elongated member, e.g., an elongated structure such as a pole, which may be disposed between a drone and a screen. A strut may alternatively be a cylindrical, polygonal, and/or irregular structure, or a tubular structure, rod, peg, polygonal cube, or a wall having irregular contours. A strut may have opposing ends. A strut may have a threaded portion and a non-threaded portion. A strut may in some cases have a threaded portion on both ends. Additionally, in certain cases, an end of a non-threaded portion of the strut may be abutted against a lower surface of the screen, or against an internal part of an aperture. Moreover, a threaded portion adjacent to an end of a non-threaded portion of a strut may extend through an aperture in a screen and/or a drone. In some cases, removable coupling of a strut to a screen and a drone may prevent the screen from shifting or separating relative to the struts, or at least substantially inhibit such movement. A strut may include an aperture disposed through its opposing ends so that one or more electrical wires may be extended through the aperture.

The term "surface" as used herein means any face of a body or thing, e.g., a screen or a drone. A "surface" may be, for example, any flat or substantially flat portion of a screen, including, for example, any part or the entire flat portion of the screen. A surface may also refer to that flat or substantially flat area that extend radially around a cylinder which may, for example, be part of a drone or a screen. One example of the term "surface" is the upper surface of a screen, and also the lower surface of the same screen, which may be flat, and the lower surface may face (be directed towards) a drone and the upper surface may face the opposite direction, e.g., the sun. A drone that may have a lower surface and an upper surface, both of which may be planar. A drone may have an upper surface that faces the lower surface of a screen and the lower surface that faces the same direction as the lower surface of the screen. A drone may have a non-planar surface that has some irregular contours. A surface may include water-repellant material, e.g. rubber and/or electrostatic material.

The term "target" as used herein means a person, object, structure, or surface onto which shade may be cast, e.g. an area of the ground occupied by an individual person. A target may have corresponding GPS data.

The term "threaded" as used herein is defined having threads. Threads may include one or more helical protrusions or grooves on a surface of a cylindrical object. Each full rotation of a protrusion or groove around a threaded surface of the object is referred to herein as a single "thread." A strut may include a "threaded portion" wherein a section of the strut includes threads. A threaded portion of the strut may extend from an end of a non-threaded portion of the strut. A strut may include more than one threaded portion. For example, a strut may include two end portions having threads with a non-threaded portion positioned between them. A threaded portion may, for example, refer to a portion of a cylindrical substructure of a strut having a threaded outer surface for mating with threads on a nut. A threaded portion may have a diameter sized to extend through an aperture of a screen and/or a drone. In certain cases, a threaded portion of a structure may be removably coupled to a threaded assembly.

The term "threaded assembly" as used herein refers to an assembly that includes threads, and preferably also includes one or more nuts, one or more bolts, one or more washers, and/or one or more spacers used for coupling two objects together. A nut, a washer, and a spacer may, for example, share a common central axis line. A nut may have a threaded inner surface that may mesh with outer threads on an object, e.g., threaded portion of a strut. A bolt may have a threaded outer surface that may mesh with inner threads on an object, e.g., threads in a strut. A threaded assembly may include a washer that is disposed against and in physical contact with an upper surface of screen and a bolt having a threaded outer surface that is disposed against and in physical contact with the washer. When coupled to the threaded portion, the threaded assembly may be abutted against an upper surface of a screen or a drone. A threaded assembly may further include one or more washers and/or one or more spacers disposed against a screen or a drone. A threaded assembly may be coupled to a threaded portion of a strut and disposed against an upper surface of a screen. A threaded assembly may be coupled to a threaded portion of a strut and disposed against a lower surface of a drone.

The term "transmittance value" as used herein is defined as the ratio of light radiation perpendicularly incident on a substance that is transmitted through the substance and calculated according to a formula specified in JIS R 3106 Testing method. Transmittance refers generally the effectiveness of a substance in transmitting radiant energy, e.g., visible light. A completely opaque material has a transmittance value of zero. A completely transparent material has a transmittance value of 100. Thus, for example, one or more portions of a drone and its components, e.g., drive units, motors, and rotors, may have a transmittance value as small as 0, 1, 2, 3, 4, 5, 10, 20, 30, 40, 45, or 50 to as great as 55, 60, or 70, or 80, or 85, or 90, or 95 or even greater. In another example, one or more portions of a screen and its components, e.g., sensors, controls, and solar cells, may have a transmittance value as small as 0, 1, 2, 3, 4, 5, 10, 20, 30, 40, 45, or 50 to as great as 55, 60, or 70, or 80, or 85, or 90, or 95 or even greater.

3. Certain Specific Embodiments

Certain specific embodiments of methods, structures, elements, and parts are described below, which are by no means an exclusive description of the inventions. Other specific embodiments, including those referenced in the drawings, are encompassed by this application and any patent that issues therefrom.

The disclosure herein includes a drone assembly, preferably for providing shade, which drone assembly may include: a drone; a screen; and a strut having a first portion coupled to the drone and a second portion coupled to the screen.

The disclosure herein includes a drone assembly, preferably for providing shade, which drone assembly may include: a drone having a lower surface and an upper surface; a screen having a lower surface, an upper surface, and an aperture; a strut having a first portion coupled to the drone and a second portion extending through the aperture of the screen; a first threaded assembly coupled to the first portion of the strut and disposed against the lower surface of the drone; and a second threaded assembly coupled to the second portion of the strut and disposed against the upper surface of the screen.

The disclosure herein includes a drone assembly, preferably for providing shade, which drone assembly may include: a drone having an aperture; a screen having an aperture; and a rack station that includes a base and a rack post extending from the base, wherein the rack post may extend through the aperture of the drone and the aperture of the screen.

The disclosure herein includes a method of coupling a drone assembly to a rack station, which method may include: sliding a rack post through a first aperture that may be disposed in a drone of the drone assembly; sliding the rack post through a second aperture that may be disposed in a screen of the drone assembly; and actuating a latch that may be disposed in an end of the rack post to a locking position.

The disclosure herein includes a drone assembly, preferably for providing shade, which drone assembly may include: a drone; a screen that has a flat upper surface and is rectangular-shaped; and four struts, each strut having a first portion and a second portion, wherein the first portion of the strut is coupled to the drone and the second portion of the strut is coupled to the screen, and either the first portion is removable from the drone or the second portion is removable from the screen, or both.

The disclosure herein includes a drone assembly, preferably for providing shade, which drone assembly may include: a drone having a lower surface and an upper surface; a screen that is flat and rectangular-shaped, and has a lower surface, an upper surface, and four apertures; four struts, each strut comprising: a first portion removably coupled to the drone; a second portion extending through one of the four apertures of the screen; and a third portion abutted against the lower surface of the screen and against the upper surface of the drone; a first threaded assembly coupled to the first portion of each of the four struts and disposed against the lower surface of the drone; and a second threaded assembly coupled to the second portion of each of the four struts and disposed against the upper surface of the screen.

The disclosure herein includes a drone assembly, preferably for providing shade, which drone assembly may include: a drone; three parallel screens, wherein each screen may be flat and rectangular-shaped; and four struts, each strut comprising: a first portion removably coupled to the drone; and a second portion removably coupled to the three parallel screens.

In any one of the drone assemblies or methods disclosed herein, the screen is positioned above the drone.

In any one of the drone assemblies or methods disclosed herein, the screen is positioned below the drone.

In any one of the drone assemblies or methods disclosed herein, the screen may have a surface area of from 4 to 16 square feet, and in other drone assemblies or methods, greater than 16 square feet, e.g., in combined drone assemblies that are formed by connecting two or more individual drone assemblies.

In any one of the drone assemblies or methods disclosed herein, the drone may include a drone body having a light transmittance value of 70 or more, e.g., 70-100, and a screen having a light transmittance value of 50 or less, e.g., 0-50.

In any one of the drone assemblies or methods disclosed herein, the screen may include an electronic light-emitting display.

In any one of the drone assemblies or methods disclosed herein, the screen may have an upper surface that is partially or fully covered with a light reflecting material.

In any one of the drone assemblies or methods disclosed herein, the drone assembly may include a plurality of connectors for rigid and communicative connection to another drone assembly.

In any one of the drone assemblies or methods disclosed herein, the drone assembly may include a screen that includes an aperture, and a strut with a second portion that extends fully or partially through the aperture.

In any one of the drone assemblies or methods disclosed herein, a threaded assembly may include a nut having a threaded inner surface.

In any one of the drone assemblies or methods disclosed herein, a strut may further include a third portion with a first end abutted against an upper surface of a drone and second end abutted against the lower surface of a screen.

In any one of the drone assemblies or methods disclosed herein, a first threaded assembly may include a washer disposed against and in physical contact with a lower surface of a drone and a nut having a threaded inner surface disposed against and in physical contact with the washer.

In any one of the drone assemblies or methods disclosed herein, a second threaded assembly may include a washer that is disposed against and in physical contact with the upper surface of a screen and a nut having a threaded inner surface that is disposed against and in physical contact with the washer.

In any one of the drone assemblies or methods disclosed herein, a rack station may include a latch disposed in a rack post.

In any one of the drone assemblies or methods disclosed herein, a rack station may include a latch disposed in the rack post, and wherein the latch is capable of being actuated to a locked position or an unlocked position.

In any one of the drone assemblies or methods disclosed herein, the screen may have a surface area from 4 to 40 square feet.

In any one of the drone assemblies or methods disclosed herein, the screen may have an upper surface that is partially or fully covered with one or more solar cells.

In any one of the drone assemblies or methods disclosed herein, the screen may include a plurality of magnetic connectors for connection to another screen.

In any one of the drone assemblies or methods disclosed herein, the screen may include four apertures, and the second portion of one of the four struts extends fully or partially through each of the apertures.

In any one of the drone assemblies or methods disclosed herein, the second threaded assembly may include a nut having a threaded inner surface for meshing with outer threads of one of the four struts.

In any one of the drone assemblies or methods disclosed herein, the second threaded assembly may include a bolt having a threaded upper surface for meshing with inner threads of one of the four struts.

In any one of the drone assemblies or methods disclosed herein, one or more of the four struts further may include third portion with a first end abutted against the upper surface of the drone and second end abutted against the lower surface of the screen an aperture disposed therethrough for receiving one or more electrical wires.

In any one of the drone assemblies or methods disclosed herein, each screen of the three parallel screens may have a plurality of apertures.

In any one of the drone assemblies or methods disclosed herein, each screen of the three parallel screens may have an aperture for receiving the second portion of one of the four struts.

In any one of the drone assemblies or methods disclosed herein, the three parallel screens may not be in physical contact with each other.

In any one of the drone assemblies or methods disclosed herein, one screen of the three parallel screens may have a light transmittance value of 70.

In any one of the drone assemblies or methods disclosed herein, one screen of the three parallel screens may have an upper surface that is partially or fully covered with rubber.

In any one of the drone assemblies or methods disclosed herein, one screen of the three parallel screens may have an upper surface that is partially or fully covered with one or more solar cells.

4. Specific Embodiments in the Drawings

The drawings presented herein are for illustrative purposes only and do not limit the scope of the claims. Rather, the drawings are intended to help enable one having ordinary skill in the art to make and use the claimed inventions.

This section addresses specific embodiments of the inventions shown in the drawings, which relate to drone assemblies, elements and parts that can be part of a drone assembly, and methods for providing (casting) shade. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability.

Although the methods, structures, elements, and parts described herein have been described in detail, it should be understood that various changes, substitutions, and alterations can be made without departing from the spirit and scope of the inventions as defined by the following claims. Those skilled in the art may be able to study the preferred embodiments and identify other ways to practice the inventions that are not exactly as described herein. It is the intent of the inventors that variations and equivalents of the inventions are within the scope of the claims, while the description, abstract and drawings are not to be used to limit the scope of the inventions. The inventions is specifically intended to be as broad as the claims below and their equivalents.

FIG. 1 illustrates an example of a drone. An example of a conventional drone described herein can be found in U.S. Pat. No. 9,457,899 issued on Oct. 4, 2016 to M. J. Duffy, et al., which includes a perspective drawing identified therein as FIG. 1A, which perspective drawing is hereby incorporated by reference. In addition, a description of the various parts of the perspective drawing of FIG. 1A can be found in the '899 patent, specifically from column 5, line 37 through column 7, line 22 of that patent, and the contents of those paragraphs are also incorporated herein by reference. A drone herein is identified as a modular lift vehicle in the '899 patent. For convenience and ease of reference, the present application and resulting patent includes a perspective drawing (FIG. 1 herein) with essentially the same components and numbering scheme as the perspective drawing of the '899 patent. In the other drawings, e.g., FIGS. 2-5 (including FIGS. 2A-D, 3, 4A-F, and 5A-B), drone 100 is represented in simple block form, and all the details of drone 100 shown in FIG. 1 or the details of other embodiments of drones not shown, are not depicted in those other drawings.

Figure 2A:
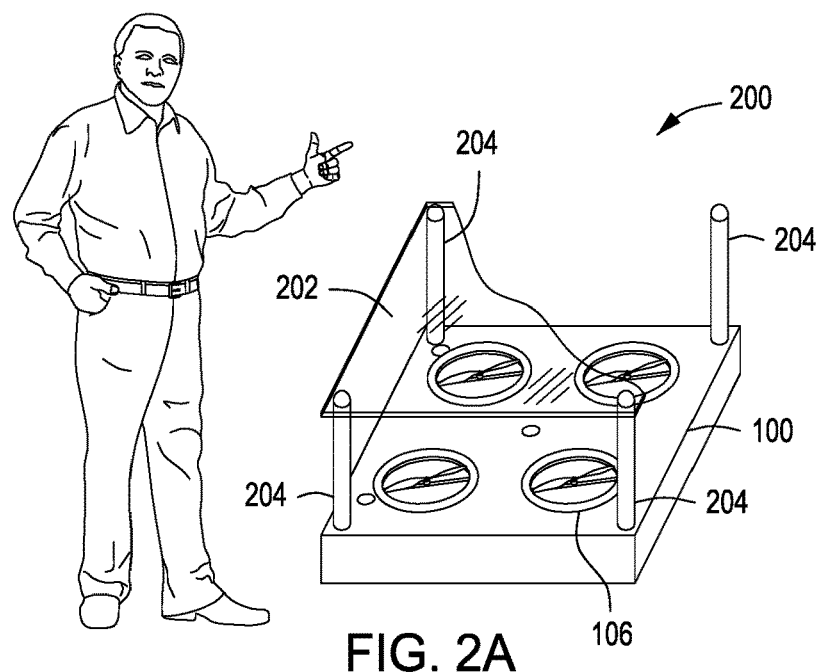
FIG. 2A shows a perspective view of a drone assembly next to a man.

FIG. 2A illustrates an example of a drone assembly 200 that includes a drone 100 and a screen 202. The drone 100 is preferably four feet in width by four feet in length, but may alternatively be of any suitable dimension as discussed elsewhere herein.

A drone assembly 200 can include drive units, controls, and sensors, which may each include communication components (not shown) capable of electronic communication with a remote control device. The remote control device may wirelessly connect to the communication components to enable and establish control data transfer between the remote control device and components of the drone, e.g., drive units, controls, and sensors. Additionally, the remote control device may include one or more data ports for wired connection to the communication components to establish control data transfer between the remote control device and components of the drone, e.g., drive units, controls, and sensors.

Control data may include any computer-implemented instructions and/or other flight parameters that when implemented may cause one or more controllers on a drone assembly 200 to alter a speed of each drive unit 106 and/or to affect a flight characteristic of each drone assembly 200.

Each drone assembly 200 may be operative (cable of being operated) to perform controlled three-axis flight when not coupled to other drone assemblies 200. For the purposes of this disclosure, being operative to perform three-axis flight may include responding to remote control input so that the drone assembly 200 can be maneuvered in three dimensions, e.g., along three axes. Flight may be performed autonomously via a programmed control system, manually by a remote user, or in combination where a user may override autonomous flight.

Figure 2B:
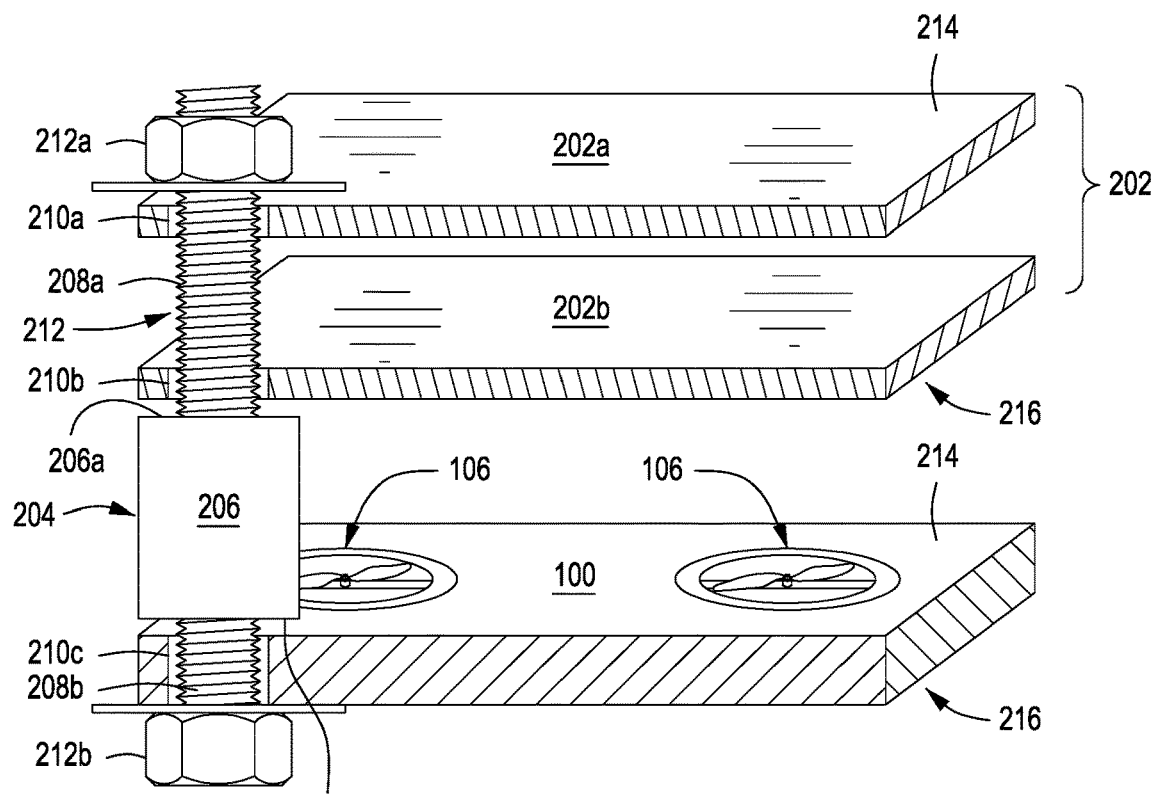
FIG. 2B shows a cross-sectional view of a strut coupled to a drone and a screen assembly that includes two screens.

Referring to FIG. 2B, a screen assembly 202 may be removably coupled to a drone 100 with at least one strut 204 that includes a threaded assembly 212. The screen assembly 202 may include upper and lower screens 202a, 202b. Each strut 204 may be disposed between a screen assembly 202 and a drone 100. A first end 206a of a central non-threaded portion 206 of the strut 204 may be abutted against a lower surface 216 of the lower screen 202b. A second end 206b of the central non-threaded portion 206 of the strut 204 may be abutted against an upper surface 214 of the drone 100. The strut 204 may have a threaded portion 208a extending through an aperture 210a disposed in the upper screen 202a and an aperture 210b disposed in the lower screen 202b. A threaded assembly 212a may be mated with the threaded portion 208a and abutted against an upper surface 214 of the upper screen 202a. A second end of the strut 204 may be abutted against the upper surface 214 of the drone 100. The second end of the strut 204 may have a threaded portion 208b extending through an aperture 210c disposed in the drone 100. A threaded assembly 212b may be mated with the threaded portion 208b and abutted against a lower surface 216 of the drone 100. In this manner, each strut 204 may be removably coupled to the screen assembly 202 and the drone 100. A drone assembly having a screen assembly with only a single screen (rather than an upper and lower screen) may have a similar arrangement.

Any drone assembly may be capable of autonomous and/or remotely controlled flight, and may rely on interactions between onboard controls (not shown) and a sensor suite (see FIG. 1) which may receive input about the position of the sun, each drone, and a target. Such controls and sensor suite may include any type of sensors and components, e.g. proximity sensors, photo sensors, gyroscopes, accelerometers, and magnetometers, used for control of each drone.

One or more controls and a sensor suite may each include one or more signal receivers for receiving remote controls from a remote control device. Moreover, the controls and sensor suite may include one or more controllers operative for implementing stored or received instructions for autonomous flight from one location to another via pre-programmed target locations according to pre-programmed flight characteristics such as altitude, velocity, climb and descent locations and rates, and the like. The controls and sensor suite may include an inertial measurement unit and global positioning system (GPS) components to aid in navigation and flight controls. The controls and sensor suite may additionally include any type of sensors or feedback mechanisms corresponding to the drone or the ambient environment. It should be understood that the present disclosure contemplates any type of sensors and components that may be beneficial to operation of the drone and a corresponding drone assembly described herein. Furthermore, controllers and components of a sensor suite may be disposed on the drone and/or screen assembly in such a way that their function may be unimpeded.

Figure 2C:
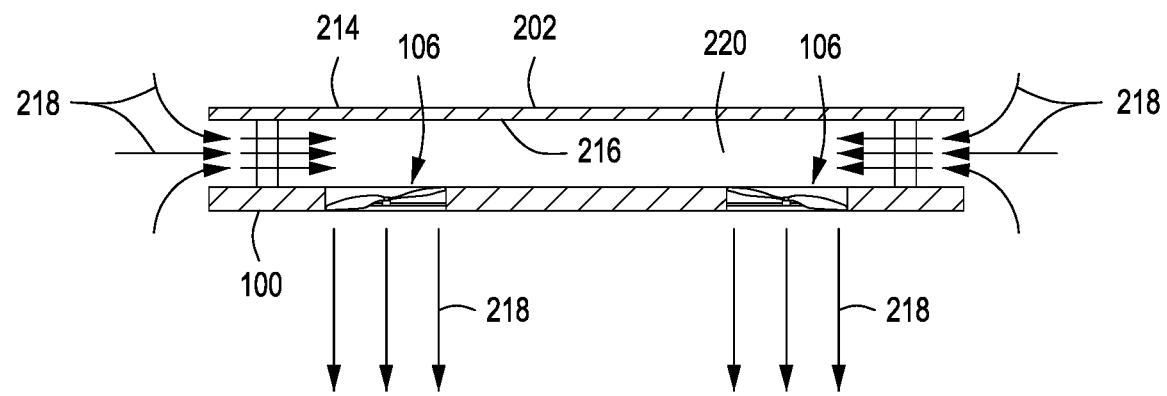
FIG. 2C shows a cross-sectional side view of a drone assembly.

Referring to FIG. 2C, in order for a drone 100 to generate adequate lift for flight, each drive unit 106 should draw a relatively constant supply of air through the drive unit 106. During flight, a motor turns each rotor 104 (see FIG. 1) rapidly to draw surrounding air to flow towards the corresponding drive unit 106, as represented by arrows 218. If the screen 202 is mounted too close to the drive units 106, lack or deficiency of flowing air supply tends to prevent or hinder flight of the drone 100. Thus, as depicted in a side-view of the drone 100 in FIG. 2C, the screen 202 should be removably coupled a sufficient distance above the drone 100 (e.g., from as little as 0.5 inch to as much as 12 inches) so as to define a gap 220 through which air (see arrows 218) may be drawn into the drive units 106.

Figure 3A:
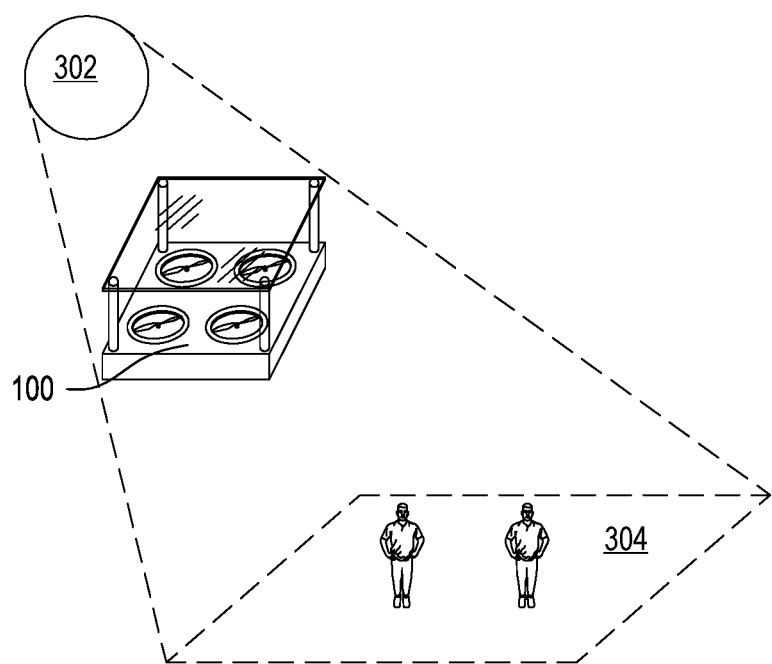
FIG. 3A shows a perspective view of a drone assembly casting shade over a target area.

Referring to FIGS. 2C and 3A, the screen assembly 202 (which comprises only one screen) has an upper surface 214 and a lower surface 216. The upper surface 214 may receive light from the sun or some other light source, but in some cases, e.g., when the screen is opaque, the light received from above by the upper surface 214 does not penetrate through the screen so that the screen effectively obstructing that particular light which provides shade on any target on the opposite side of the screen from the light source, as shown in FIG. 3A.

Figure 2D:
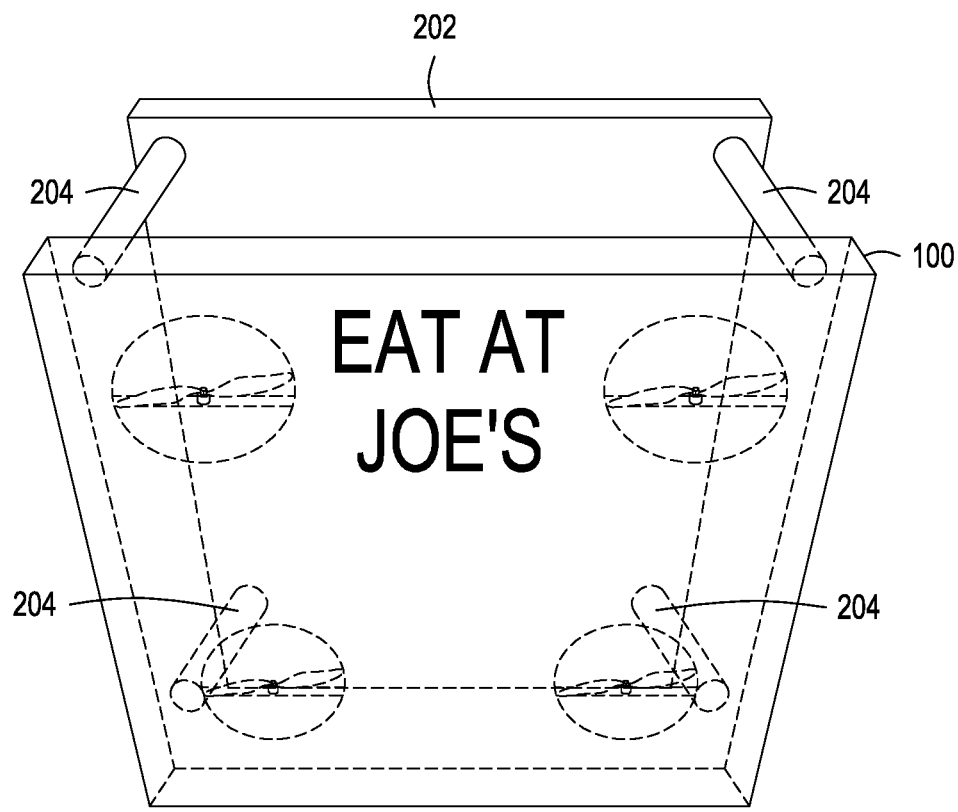
FIG. 2D shows a perspective view of a drone assembly having a screen displaying graphical content.

Referring to FIG. 2D, a screen assembly 202 (which comprises only one screen) includes an electronic light-emitting display, e.g., computer monitor or LCD screen that can display graphical content, e.g., videos, images, and/or text. The screen assembly 202 may be communicatively connected to controls on the drone 100 to receive instructions to display graphical content, e.g., through wireless communication or through wires running through one or more of the struts 204, which may be hollow to permit the wires to run through the center of the strut.

FIG. 2E and FIG. 2F illustrate a drone assembly 200 that may draw air (indicated by arrows 218) through screens 202a, 202b as well as across a gap between parallel screens 202a, 202b. The screen assembly 202 may have an upper screen 202a and a lower screen 202b. The upper screen 202a has a first set of apertures 224 disposed therein. Air may pass through the first set of apertures 224. Additionally, the lower screen 202b may have a second set of apertures 222 disposed therein. Air may pass through the second set of apertures 222. As shown in FIG. 2E, the operation of the rotors of drive units 106 may result in the drawing of air down through the first set of apertures 224 and also through the second set of apertures 222 disposed in the lower screen 202b. As depicted in FIGS. 2E and 2F the two sets of apertures have the same sizes and shapes and are aligned. Alternatively, the two sets of apertures 222, 224 may be sized and/or shaped differently and offset from each other such that, in some cases, light passing down through any aperture of the upper set of apertures 224 does not pass through any aperture of the lower set of apertures 222.

Figure 2G:
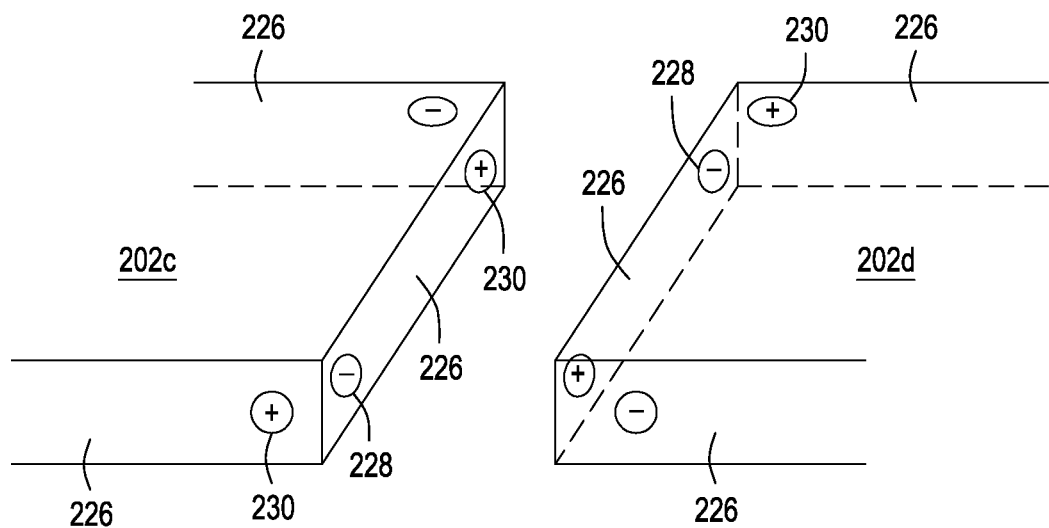
FIG. 2G shows a screen having magnetized connectors disposed on side surfaces of the screen.

FIG. 2G illustrates two side-by-side screen assemblies 202c, 202d, each having magnetic connections disposed on the side surfaces 226 of each respective screen. On each side surface 226, a first magnetic connection 228 may be disposed on a first end and a second magnetic connection 230 may be disposed on an opposing, second end of the side surface 226 of the screen 202. The magnetic pole, e.g., south, of the first magnetic connection 228 is opposite of the magnetic pole, e.g., north, of the second magnetic connection 230. As shown in FIG. 2G, two screen assemblies 202c, 202d from two separate drone assemblies may be connected via magnetic connection pairs 228, 230 at corresponding ends of the screens 202a, 202b. The magnetic connection pairs 228, 230 have opposing magnetic charges so that they may be attracted to each other to keep the screens 202a, 202b coupled.

To disconnect the screens, an onboard control may cause an electrical current to pass through the magnetic connections 228, 230 to cause the magnetic connections 228, 230 to reverse polarity, thereby repelling the screens 202a, 202b apart.

A drone 100 may have a body and components, e.g., rotors, motors, controllers, or sensors, having a light transmittance, e.g., transparency or clarity, value ranging from 0 to 95. Thus, a person looking up at a drone in-flight, preferably at night, may see through the drone 100 and see graphical content from the lower surface of the screen 202.

In various versions, a plurality of drone assemblies 200 may be coupled to cast larger shade during flight. A drone 100 in each drone assembly 200 may be coupled to a drone 100 in another drone assembly 200. An example of individual drones a joined together described herein can be found in U.S. Pat. No. 9,457,899 issued on Oct. 4, 2016 to M. J. Duffy, et al., which includes a perspective drawing identified therein as FIG. 2A, which perspective drawing is hereby incorporated by reference. In addition, a description of the various parts of the perspective drawing of FIG. 2A can be found in the '899 patent, specifically from paragraphs in column 7, line 23 through line 56 of that patent, and the contents of those paragraphs are also incorporated herein by reference.

Figure 3B:
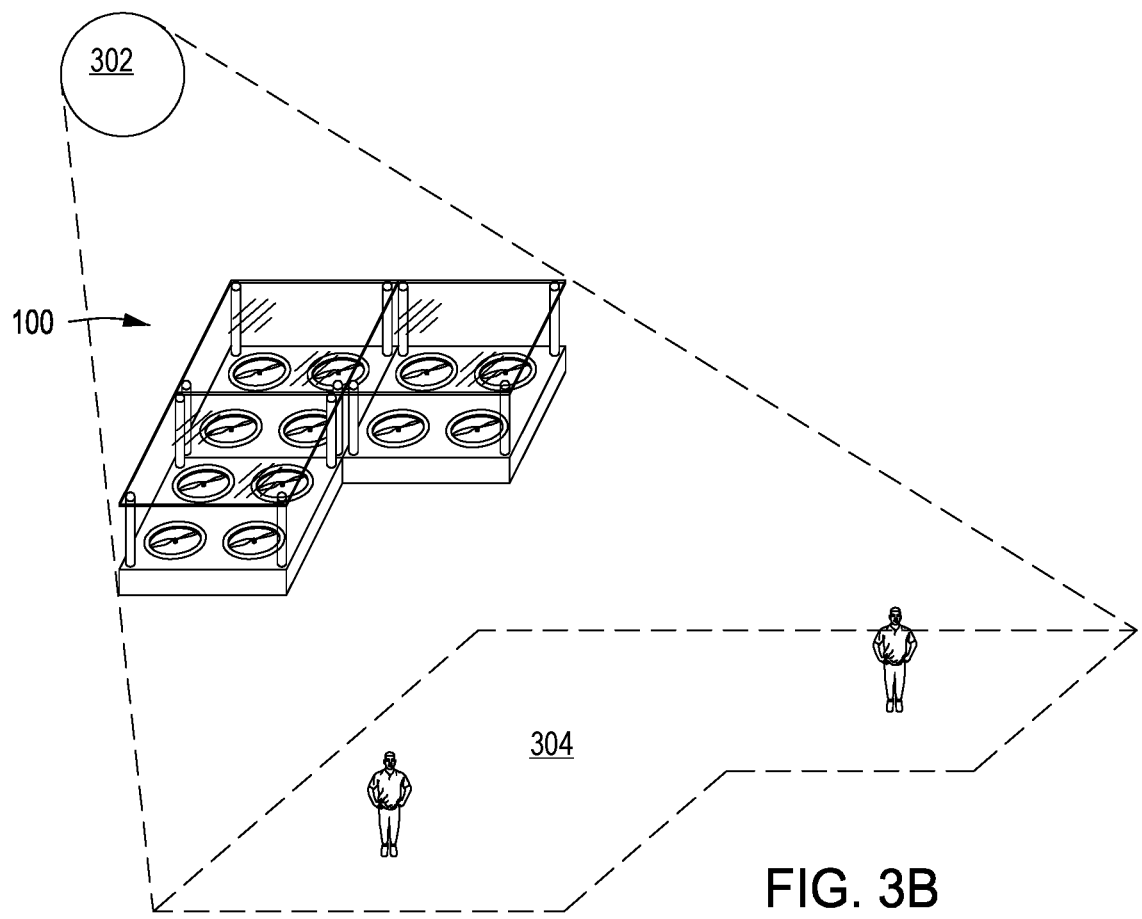
FIG. 3B shows a perspective view of a different drone assembly casting shade over a target.

FIG. 3B illustrates shade casted over a target 304 based on a configuration of coupled drone assemblies 200. In various versions, any number of drone assemblies 200 may be coupled in varying configurations. Examples of a drone assembly having varying configurations described herein can be found in U.S. Pat. No. 9,457,899 issued on Oct. 4, 2016 to M. J. Duffy, et al., which includes perspective drawings identified therein as FIG. 8 and FIG. 12, which perspective drawing is hereby incorporated by reference. A description of the various parts of the perspective drawing of FIG. 8 can be found in the '899 patent from paragraphs in column 9, line 23 through 33, and the contents of those paragraphs are also incorporated herein by reference. A description of the various parts of the perspective drawing of FIG. 12 from paragraphs in column 10, line 1 through 10, and the contents of those paragraphs are also incorporated herein by reference.

The drones 100 of each drone assembly 200 may be coupled via magnetic connections (FIG. 2G) as discussed above. Additionally, the drones 100 of each drone assembly 200 may be coupled via exemplary connectors described herein and can be found in U.S. Pat. No. 9,457,899 issued on Oct. 4, 2016 to M. J. Duffy, et al., which includes perspective drawings identified therein as FIG. 15 through FIG. 22, which perspective drawing is hereby incorporated by reference. A description of the various parts of the perspective drawing of FIGS. 15 through 22 can be found in the '899 patent, specifically from paragraphs in column 10, line 28 through column 14, line 21 of that patent, and the contents of those paragraphs are also incorporated herein by reference.

Regardless of number, the coupled drone assemblies 200 may operate as a single remotely controlled unit in much the same manner as an individual drone assembly 200 would operate. In other words, the coupled drone assemblies 200 cooperate for controlled three-axis flight.

Before and after being put into flight, a drone assembly 200 may be stored on a rack station for transport, as shown in the views A-D of FIG. 4. FIG. 4A illustrates a perspective view of a rack station 402 having rack posts 404 extending from a base 406. FIG. 4B shows a plan view of rack posts 404 arranged in a triangular configuration. However, in other versions, one or more rack posts 404 may be arrange in various configurations.

A latch 408 may be disposed on an end of each rack post 404 opposite the base 406. The latch 408 may be manually actuated by a user who inserts a key (not shown) into a keyhole 410 and turns the key. Additionally, the latch may be actuated electronically by receiving a signal from a remote control device that confirms a numerical pin entered by a user.

Turning the key in one direction may actuate the latch 408 to a locked position. Turning the key in another direction may actuate the latch 408 to an unlocked position. In the locked position, the latch 408 may extend radially outward through and protruding from the rack post 404. In the unlocked position, the latch 408 may retreat radially inward into the rack post 404 and, in some cases, may no longer protrude from the rack post 404.

Referring to FIG. 4C, a drone assembly 200 may include a drone 100 and a screen 202, each having apertures 402 disposed in therein. Each set of apertures on the drone 100 and each set of apertures on the screen 202 may be disposed in a configuration, e.g., triangle, corresponding to the rack posts 404 shown in FIG. 4B. A user may slide each rack post 404 through a corresponding aperture 412 in the drone 100 and a corresponding aperture 412 on the screen 202.

FIG. 4D shows that multiple drone assemblies 200 may be stored on a rack 402. For illustrative purposes, the screen 202 of each drone assembly 200 has been omitted. However, it should be understood that each drone assembly may include a screen 202 when stored on a rack station 402.

Figure 4A:
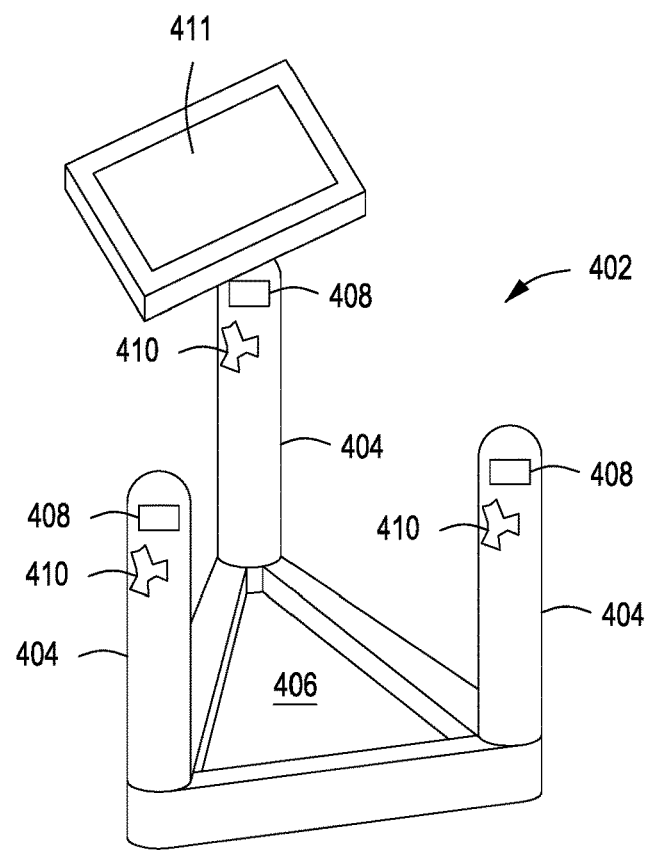
FIG. 4A shows a perspective view of a rack station.
Figure 4B:
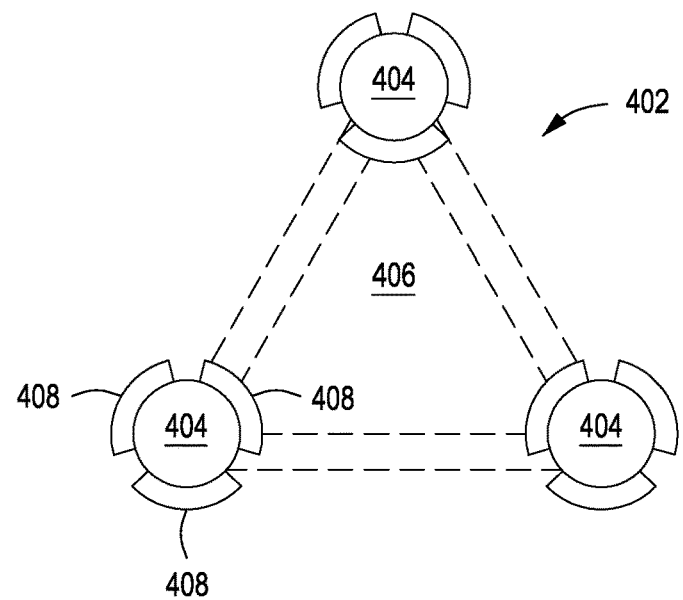
FIG. 4B shows an overhead plan view of a rack station.
Figure 4E:
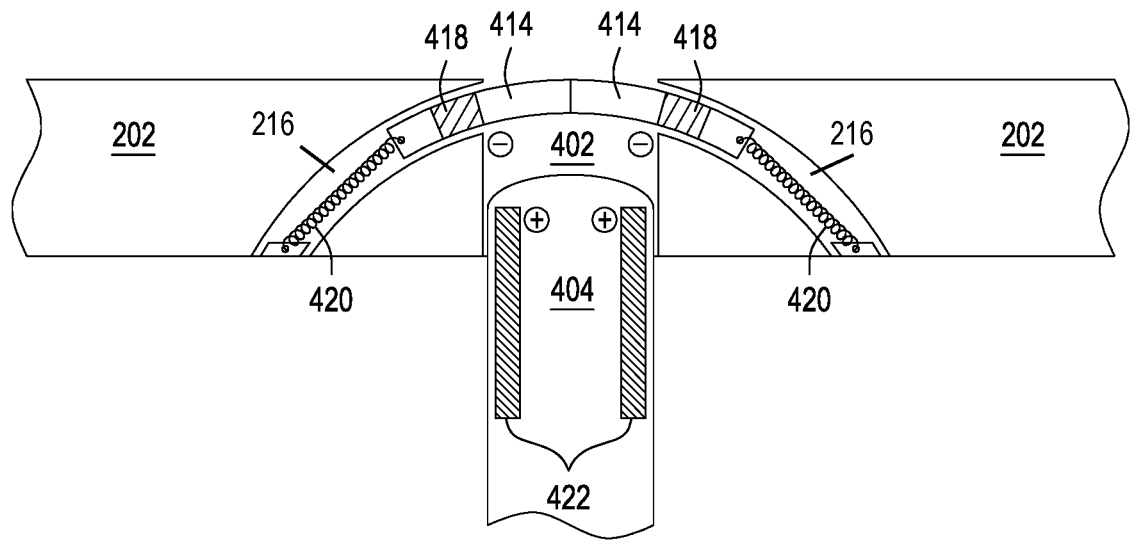
FIG. 4E shows a cross-sectional view of an aperture in a screen covered by aperture covers.
Figure 4F:
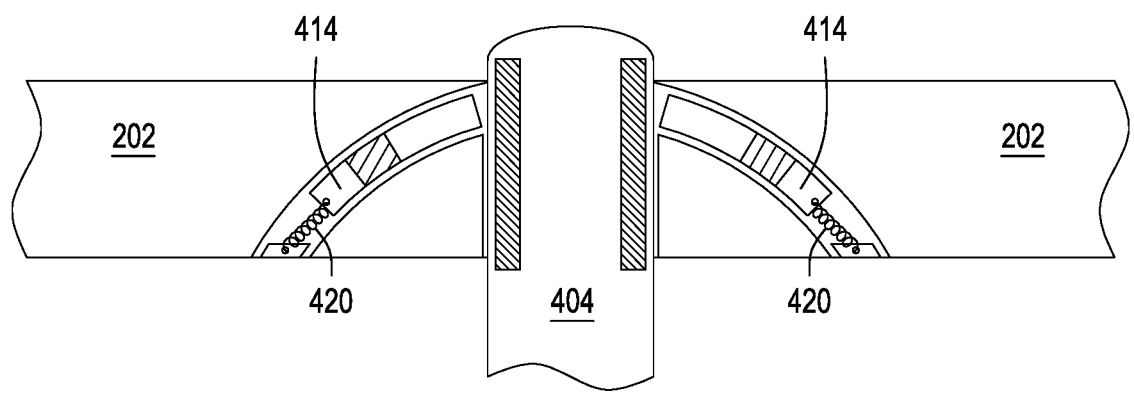
FIG. 4F shows a cross-sectional view of the aperture covers of FIG. 4E parted by a rack post of a rack station.

Referring to FIG. 4E, each aperture 412 on the screen 202 may be closed by aperture covers 414 that are coupled together. The aperture covers 414 may be coupled to form a dome that shares a central point of an aperture 412 of the screen 202. Additionally, the apex of the dome may extend through the aperture 412 and above the upper surface 214 of the screen 202. Furthermore, each aperture cover may include water-repellant material, e.g. rubber and electrostatic material.

Each aperture cover 414 may be disposed within a groove 416 of the screen 202. Each aperture cover 414 may have a magnet 418 disposed thereon. At the base, e.g., the end opposite the apex, of each aperture cover 414 a coil 420 may be used to bias the aperture covers 414 together.

One or more magnets 422 may be disposed at the top of a rack post 404 and may be used to force the aperture covers 414 to part, as shown in FIG. 4E. Each magnet 422 may be disposed on the rack post to have a similar pole facing the pole of the corresponding magnet 418 on the aperture cover 414. For instance, the north pole of the magnet 422 faces the north pole of the corresponding magnet 418. Furthermore, the magnets may be rated to have a force, e.g., 0.0001 tesla, 0.0002 tesla, 0.0003 tesla, 0.0004 tesla, 0.0005 tesla, 0.0010 tesla, or 0.0015 tesla, to overcome the biasing force of the coils 420. Thus, when the top of a rack post is placed near the aperture covers 414, the aperture covers 414 may part so the rack post 404 may pass through the aperture 412, as show in FIG. 4F.

Conversely, when a drone assembly 200 is in flight away from a rack station 400, the aperture covers may be biased by coils 420 to come together to close the aperture 412 of the screen 202.

Returning to FIG. 4D, a user may insert a key into the keyhole 410 and turn the key to actuate the latch 408 to a locked position. Additionally, the latch may be actuated electronically by receiving a signal from a remote control device that confirms a numerical pin entered by a user. With the latch in a locked position, drone assemblies 200 stored on the rack station 402 may be prevented from being removed from the rack station 402.

To remove a drone assembly 200 from the rack station 402 where the latch 408 is in locked position, a user may insert a key into the keyhole 410 and turn the key to actuate the latch 408 to an unlocked position. The drone assembly 200 may then be removed from the rack station 402.

The rack station 402 may include a recharging device (not shown). A ground power supply line may be used to connect to the recharging device via a ground power receptacle (not shown). The recharging device may transfer electromagnetic energy from the rack station 402 to all batteries within each drone 100 that may be stored on the rack station 402. The recharging device may be capable of being in physical contact with connectors (not shown) on a rechargeable battery. The batteries may include inductive receivers employing resonant inductive coupling coils to receive electromagnetic energy from the recharging device.

A remote control device 411 (FIG. 4A) having software for a flight mission application may be used to maneuver one or more drone assemblies 200 between the sun 302 and a target 304. It should be appreciated that the user interface described herein is an example used for illustrative purposes and should not be construed as limiting. Rather, the user interface may be configured as desired according to the desired configuration processes and the desired format of the control inputs for controlling one or more drone assemblies 200.

The remote control device 411 may include a tablet computer device, a smartphone, a wearable computer device, or any handheld remote control input device. The flight mission application stored on the remote control device 411 may be operative to execute computer-controlled instructions for performing the configuration process operations described below. It should be understood that the remote control device 411 may include a processor, volatile and/or non-volatile memory, an operating system, and all hardware and software used for wireless communication with each drone assembly 200 and rack station 402.

As discussed above, each drone assembly 200 may be capable of controlled three-axis flight in response to inputs from the remote control device 411. Utilizing concepts described herein, any number of drone assemblies 200 may also be operative to perform controlled three-axis flight in response to inputs from the remote control device 411. In order to direct appropriate control commands to the appropriate drone assemblies 200 or drive units 102, the remote control device 411 may provide the user interface for receiving all applicable data regarding the drone assemblies 200 and the corresponding flight mission during a configuration process. Accordingly, the user interface may include a number of user input controls for initiating various processes.

The user input controls may include a define target control, a define formation control, a define mode control, a validate control, and a run control. Fewer or additional user input controls may be utilized without departing from the scope of this disclosure.

First, a user may select the define target control to initiate the configuration process for a flight mission. The define target control captures user input about various characteristics of the target 304. These characteristics may include, but are not limited to, location of a target 304, current position of the sun 302, and an area of shade to cast. User input may be textual, e.g. physical address or GPS coordinates. Additionally, user input may include use of a touchscreen interface to identify the target 304 on a map.

After selecting the define target control on the user interface, the flight mission application may display a map. The map may include an overhead view of an area encompassing the flight mission. The user may create and revise a target location and a flight route via the user interface. Alternatively, the user may use a keyboard to input location information for the target location, which is then used by the flight mission application to display the map and associated target location. According to various versions, any quantity and type of flight mission data may be displayed in textual format in addition to or in place of the map.

According to various versions, the drone assemblies 200 may be controlled autonomously during the flight mission so that user input is not provided, or may be controlled manually by the user via controls on the remote control device 411, or a combination of the two. An example flight mission may include autonomous flight from a starting location to a target location at which the user manually flies the drone assemblies 200 into position. If all or a portion of the flight mission is to be performed autonomously, then the route may be input into the user interface for use by the flight mission application.

After the applicable characteristics of the target location 304 has been defined, the user may select a define formation control to define the number and formation of drone assemblies 200. 411 The user may use the flight mission application to take a photograph of a target area. The photograph may be render in a graphical format by the flight mission application. Next, the user may choose a minimum of three points of reference to determine a proposed formation for the drone assemblies 200. Upon selecting the define formation control, the user interface may display a positioning diagram. The positioning diagram may include any number of potential positions within a formation of drone assemblies 200.

The user may select the appropriate number and position of the drone assemblies 200 corresponding to the desired formation by touching the positioning diagram on the user interface at the appropriate potential positions. The formation of the drone assemblies 200, in some cases, may not have to be symmetric. Rather an asymmetric formation may be beneficial depending on the parameters of the flight mission. For example, the drone assemblies 200 may be used to cast shade over a target 304 that has an irregular shape or perimeter. An asymmetric formation may allow for the drone assemblies 200 to cast shade more precisely relative to the target 304.

The flight mission application may select or suggest an appropriate formation for the drone assemblies 200, including the number and positioning of each drone assembly 200. To do so, the flight mission application may utilize the target 304 information input by the user, taking into account the performance capabilities of a drone assembly 200. The flight mission application may provide multiple formation options, allowing the user to select one for use. Additionally, the flight mission application may suggest a formation, while allowing the user to customize the formation as long as the customized formation provides the minimum performance capabilities for the particular flight mission.

Upon selection of the number and positioning of the drone assemblies 200, the user may assemble the drone assemblies 200 using the appropriate connectors. Alternatively, in some cases, the user may have the drone assemblies 200 fly in formation, but without being physically coupled. The user may then select a begin registration control to initiate a registration process used to establish the position of each drone assembly 200 with respect to the other drone assembly 200. The remote control device 411 may establish the relative location of each drone assembly 200 with respect to the overall formation. This information may then be sent to the controller 140 on each drone assembly 200.

Upon successfully establishing communications with the remote control device 411, each drone assembly 200 may then provide a registered indicator to provide the user with a notification that the drone assembly 200 has been successfully registered. The representation of the drone assembly 200 on the positioning diagram may also change to notify the user that the registration process for that drone assembly 200 is complete. In this example, the representation of the drone assembly 200 on the positioning diagram preferably changes from broken lines to solid lines; however, any applicable notification may be used within the scope of this disclosure.

This registration process may continue until all of the drone assemblies 200 have been successfully registered. In this manner, the flight mission application may establish the position of each drone assembly 200 relative to the other drone assemblies of the formation and provides that information to the controllers 140 of each drone assembly 200. Based on this information, the flight mission application may adapt the control instructions for controlling the multiple drive units 102 of a drone assembly 200 for controlled three-axis flight to controlling multiple drone assemblies 200 in controlled three-axis flight. When registration is complete, each drone assembly 200 may be assigned a number. This number, in some cases, may not only be used for control purposes, but may also be for the purposes of health monitoring as well as notifying the user in the event of an operational inconsistency.

The control of each drone assembly 200 during the flight mission may occur in various manners. First, the remote control device 411 and corresponding flight mission application may establish where each drone assembly 200 is located relative to other drone assemblies 200 during the registration process. Each drone assembly 200 may be then assigned its own mode or category based on its positioning as if it were a control surface of an aircraft so that it responds accordingly to commands directed to that control surface. For example, if a roll command is provided by the remote control device 411, the drone assemblies 200 located off to the sides from the center of gravity may drive all four rotors 104 at a similar rate to initiate the roll. Because the drone assemblies 200 know their relative position from the center of gravity, they can calculate from their own inertial measurement units and altitude. A benefit of this control method may be that a central computer is not required to capture the state of each drone assembly 200. Alternatively, all vehicle data associated with each drone assembly 200 may be downlinked to the remote control device 411. The remote control device 411 may then process the data and send individual control signals to each drone assembly 200.

Figure 5A:
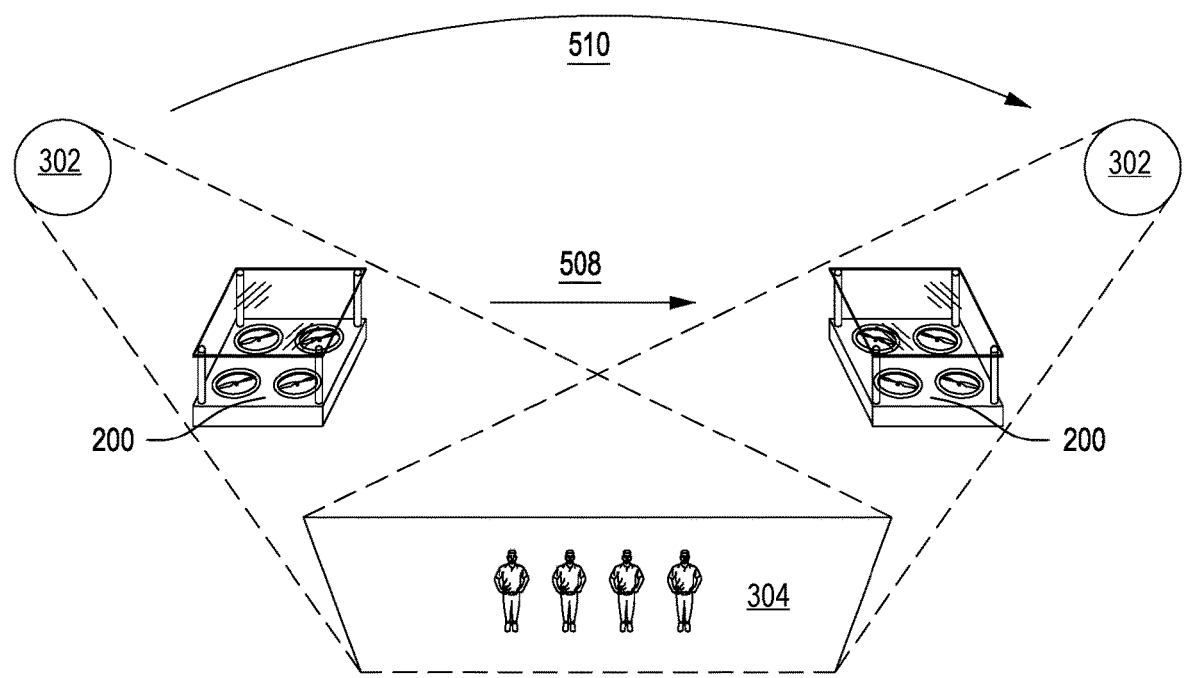
FIG. 5A shows a screen diagram of a user interface for selecting flight modes of a drone assembly.
Figure 5B:
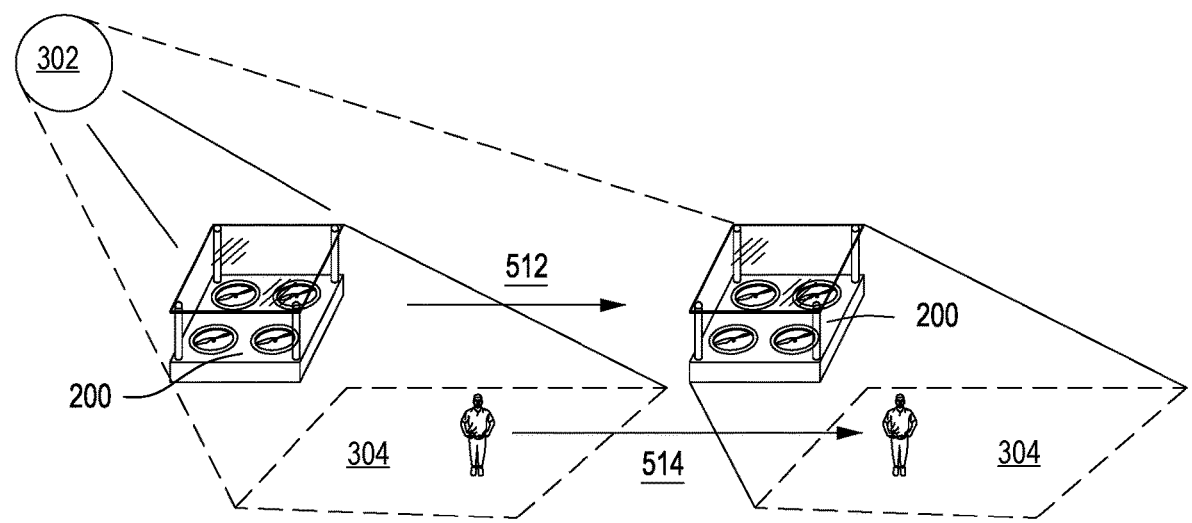
FIG. 5B shows a perspective view of a drone assembly casting shade relative to the movement of a target and of the sun.

After the formation has been defined, the user may select a define flight mode control. After selecting the define flight mode control on the user interface, the flight mission application displays optional flight modes that may include shade mode, shelter mode, and display mode. In shade mode, the drone assemblies 200 may be instructed to track and/or may be maneuvered (see arrow 502) relative to the movement of the sun 302 (see arrow 504) to provide shade over a target 304 having a fixed position, as shown in FIG. 5A. In shelter mode, the drone assemblies 200 may track and maneuver (see arrow 506) relative to the movement of a tracking device (see arrow 508), e.g., remote control device (see 411, FIG. 4A) or wearable device, to hover over the tracking device, as shown in FIG. 5B. Additionally, in shelter mode, the drone assemblies 200 may be instructed to hover over a fixed location or target regardless of movement of the sun 302 or the tracking device.

If the user selects display mode, the user may also select multimedia content, e.g., videos, images, text, and audio, which may be transmitted to the controls on the drone assemblies 200. The controls may instruct the graphical content to be displayed on the lower surface 216 of the screen 202. During the flight mission, the user may update graphical content selections and their display patterns. Additionally, in display mode, the drone assemblies 200 may track a target 304 and fly relative to the target 304 in a pattern select by the user. Display mode may be performed alone or in conjunction with either shade mode or shelter mode.

After the flight mode has been defined, the user may select a validate control. The validate control may initiate a validation process that ensures that the drone assemblies 200 have been properly configured and is responding appropriately to flight command input. According to one version, when the validation process begins, the remote control device 411 may test the communication with all drone assemblies 200 and will initiate a test lift of the drone assemblies 200. Once the test is complete, the flight mission application may validate threshold sensor data from each drone assembly 200 to ensure that each control and sensor suite 118 and each drive unit 102 is functioning within allowed parameters. Any anomalies may be noted. When validation is complete, the user may select the run control and the over a target 304 having a fixed position commences and proceeds as programmed.

At flight mission commencement, each rack station 402 may have a status of FULL to indicate that the rack station 402 has an appropriate number of drone assemblies 200. Once the first drone assembly departs from a rack station 402, status of the rack station 402 may be changed to PARTIAL. Drone assemblies 200 may continue to depart from its corresponding rack station 402 until none are left, and the status of that rack station 402 changes to EMPTY.

When a drone assembly 200 is instructed to return to base, the flight mission application may be used to identify and direct the drone assembly 200 to land on a rack station 402 having the lowest index number and a status of EMPTY. If no rack station has a status EMPTY, then the flight mission application may locate and direct the drone assembly 200 to land on the rack station 402 having the lowest index number and a status of PARTIAL. The above process may be repeated until all drone assemblies 200 return to the rack stations 400.

If all or any portion of the flight mission is to be flown manually, the remote control device 411 may provide a user interface having manual controls. According to this example, the user interface may include any number and type of information or control areas, including but not limited to, a map, a health monitor, and manual controls. The map may show an overhead view of an area encompassing the flight mission, including the target location and a flight route defined during the configuration process described above. The map may additionally highlight or otherwise identify the current location of the drone assemblies 200 on the flight route in real time during the flight mission.

The health monitor may provide a representation of the drone assembly 200, including the assigned numbers of each drone assembly 200 within the formation. If an operational inconsistency is detected with respect to a drone assembly 200 during the flight mission, notification may be provided to the user by the health monitor. Notification may take the form of a flashing number associated with the drone assembly 200, a change in color of the drone assembly 200 or corresponding number, or any other suitable visual and/or audible notification mechanism.

The manual controls may include primary controls and precision controls, according to one version. Using the primary controls, a user may command the drone assemblies 200 to perform a counter clockwise rotation (CCW), a clockwise rotation (CW), to move up, down, left, right, forward, and reverse. These commands may occur sequentially or simultaneously. The precision controls may be used to "nudge" the drone assemblies 200, or provide substantially minor control input, according to the primary control commands. For example, to provide a very minor altitude correction and nudge the drone assemblies 200 downward slightly, the user may use the precision control.

During the flight mission, a drone assembly 200 may, in some cases, no longer communicate with the remote control device 411 for a period of time. In such a situation, the drone assembly's onboard controllers autonomously maneuver the drone assembly 200 to its originally position of departure, e.g. rack station.

Additional details will be provided regarding examples presented herein for maneuvering a drone assembly 200. It should be appreciated that the logical operations described herein may be implemented (1) as a sequence of computer implemented acts or program modules running on a computing system and/or (2) as interconnected machine logic circuits or circuit modules within the computing system. The implementation may, as a matter of choice, be dependent on the performance and other operating parameters of the computing system. Accordingly, the logical operations described herein may be referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

Figure 6:
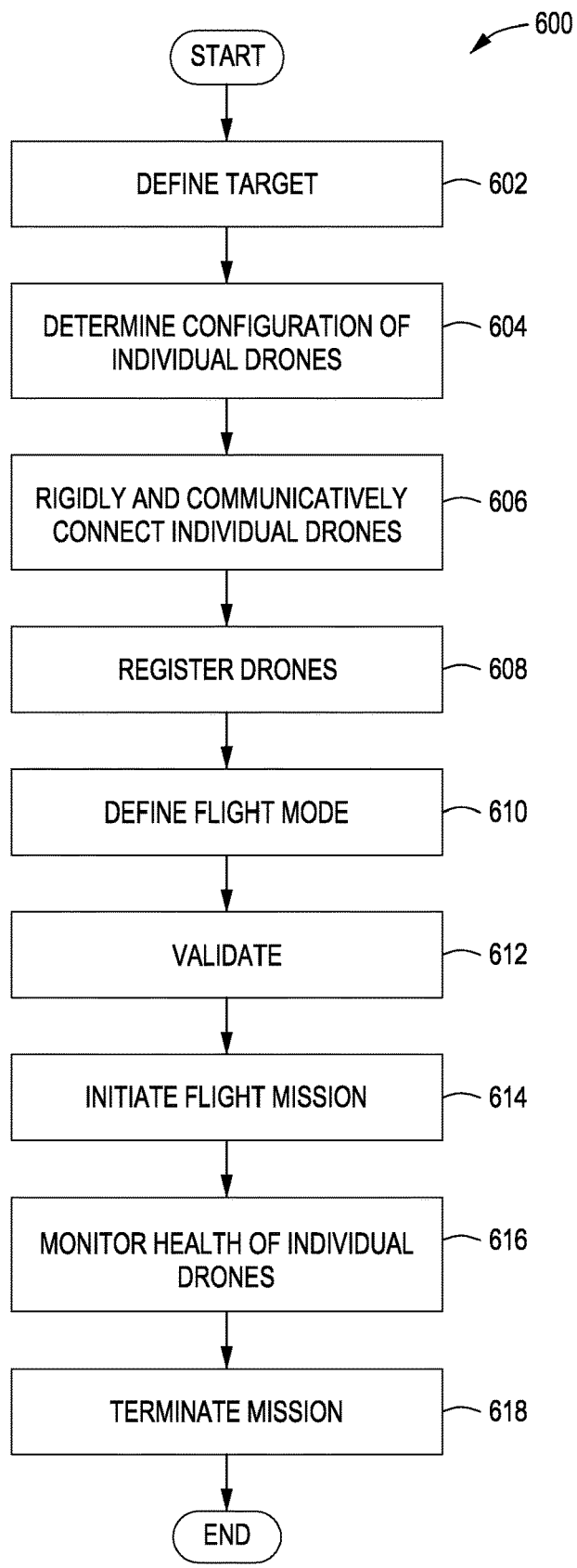
FIG. 6 shows a flow diagram for a method of maneuvering a drone assembly to cast shade over a target.

FIG. 6 shows a routine 600 for maneuvering shade utilizing a drone assembly 200. The routine 600 begins at operation 602, where the positions of the target 304 and the sun 302 may be defined. The user may use the define target control on the remote control device 411 to input data for the location of a target. Data for the current position of the sun 302 may be acquired continuously by the remote control device 411 from online internet services. Additionally, the remote control device 411 may determine the position of the sun 302 based on data the sensor suites 118 on each drone assembly 200. The data may be sent to the remote control device 411 from controllers in the drone assembly 200.

When the relative positions of the target 304 and the sun 302 have been defined in the flight mission application on the remote control device 411, the routine 600 may continue to operation 604, where the formation of drone assemblies 200 is determined. From operation 604, the routine 600 may continue to operation 606, where the drone assemblies 200 may be rigidly coupled using appropriate connectors.

At operation 608, each drone assembly 202 may be registered. The registration process may provide the flight mission application with positioning information for each drone assemblies 200, and may also provide each drone 200 with its position respective to other drone assembly 200. The routine 600 may continue from operation 608 to operation 610, where the flight mode may be defined in which the user selects various options to instruct how the drone assembly may display graphical content and/or maneuver during the flight mission, e.g., relative to the sun 402 and target 304 and/or a selected flight pattern relative to the target 304.

With the target 304 and flight mode defined, the routine 600 may continue to operation 612, where the flight mission application validates the formation and controls.

As described above, the validation process may test the communications between each drone assembly 200, as well as between each drone assembly 200 and the remote control device 411. The control inputs from the remote control 411 to the drone assemblies 200 may be additionally tested, as is the ability to lift and maneuver.

When the validation is complete, the routine 600 may proceed to operation 614, where the flight mission is initiated. The user may press the run control to initiate the mission. If autonomous flight is planned, each drone assembly 200 may fly to the designated location of the target 304. Upon arriving at the designated target location 304, the onboard controllers of the drone assemblies 200 may maneuver the drone assemblies 200 to a position between the sun 302 and the target 304.

At any time during the mission, or at a target location 602, the user may manually override the autonomous flight operation and manually control the drone assemblies 200 via the manual controls on the remote control device 411.

At operation 616, the health or operational status of each drone assembly 200 may be monitored. The health may be monitored by the control and sensor suite 118 of each drone assembly 200 during all phases of the flight mission. If an operational inconsistency is detected, notification may be provided to the flight mission application and provided to the user via the user interface. At operation 618, when the flight mission is complete, the flight mission application or the user may shut down the drive units 102 of the drone assemblies 200 and the mission may be terminated.

What is claimed as the invention is:

1. A drone assembly for providing shade, comprising:
   a first drone;
   a first screen coupled to the first drone, wherein the first screen has a first upper surface and a first side surface;
   a second drone;
   a second screen coupled to the second drone, wherein the second screen has a second upper surface and a second side surface;
   a magnet disposed on either the first screen or the second screen; and
   means for coupling or uncoupling during flight the first screen to the second screen, wherein the means comprises a collet or a latch;
   wherein the first side of the first screen is coupled to the second side of the second screen.

2. The drone assembly of claim 1, wherein the first screen and the second screen are coplanar.

3. The drone assembly of claim 1, wherein the first screen and the second screen are in physical side-by-side contact with one another so that no sunlight is capable of passing between the first and second screens.

4. The drone assembly of claim 1, wherein the means for coupling the first screen to the second screen comprises a means for removably coupling the first screen to the second screen.

5. The drone assembly of claim 1, wherein the first screen comprises a side having a first magnet disposed thereon and the second screen comprises a second magnet disposed thereon that is capable of attracting the first magnet to removably couple the first screen to the second screen.

6. The drone assembly of claim 1, comprising a first magnet and a second magnet, wherein the first magnet has a first magnetic pole directed away from the first screen, and the second magnet has second magnetic pole directed away from the second screen that is opposite the first magnetic pole.

7. The drone assembly of claim 1, comprising a first magnet and a second magnet, wherein the first magnet has a first magnetic pole and the second magnet has a second magnetic pole like the first magnetic pole.

8. The drone assembly of claim 1, wherein the magnet is coupled to the side surface of the first screen.

9. The drone assembly of claim 1, comprising a first magnet and a second magnet, wherein the first magnet is coupled to the first side surface of the first screen and the second magnet is coupled to the side surface of the second screen.

10. The drone assembly of claim 1, wherein the means for coupling or uncoupling during flight the first screen to the second screen is a collet.

11. The drone assembly of claim 1, wherein the means for coupling or uncoupling during flight the first screen to the second screen is a latch.

* * * * *